US006954175B1

(12) United States Patent
Cox

(10) Patent No.: US 6,954,175 B1
(45) Date of Patent: Oct. 11, 2005

(54) ACCURATE POSITIONING OF DEVICES SUSPENDED UNDERWATER FROM A FLOATING BODY

(75) Inventor: Wayne H. Cox, Harahan, LA (US)

(73) Assignee: Input/Output, Inc., Stafford, TX (US)

( * ) Notice: Subject to any disclaimer, the term of this patent is extended or adjusted under 35 U.S.C. 154(b) by 0 days.

(21) Appl. No.: 10/904,277

(22) Filed: Nov. 2, 2004

(51) Int. Cl.$^7$ ............................................. H04B 7/185
(52) U.S. Cl. ........................ 342/357.07; 342/357.03; 342/357.06; 701/214; 701/215
(58) Field of Search .................... 342/357.01, 357.02, 342/357.03, 357.06, 357.07; 701/207, 213, 701/214, 215

(56) References Cited

U.S. PATENT DOCUMENTS

| | | | | |
|---|---|---|---|---|
| 5,119,341 | A | | 6/1992 | Youngberg ...................... 367/5 |
| 5,331,602 | A | * | 7/1994 | McLaren ........................ 367/6 |
| 5,408,238 | A | * | 4/1995 | Smith ..................... 342/357.09 |
| 5,577,942 | A | * | 11/1996 | Juselis .......................... 441/21 |
| 6,657,585 | B1 | * | 12/2003 | Kucik .................... 342/357.06 |
| 6,701,252 | B2 | * | 3/2004 | Brown ........................ 701/213 |
| 6,791,490 | B2 | * | 9/2004 | King ...................... 342/357.02 |
| 6,807,127 | B2 | * | 10/2004 | McGeever, Jr. .............. 367/128 |
| 2002/0165669 | A1 | | 11/2002 | Pinto et al. | |

FOREIGN PATENT DOCUMENTS

WO   WO03/100451 A2   12/2003

OTHER PUBLICATIONS

Thales Navigation, "Aquarius2 The Dual GPS for Accurate Heading," web site advertisement at www.thalesnavigation.com, Copr. 2004, Thales Navigation, Inc.

* cited by examiner

Primary Examiner—Dao Phan
(74) Attorney, Agent, or Firm—James T. Cronvich

(57) ABSTRACT

A system for determining the position of a device attached to a floating platform floating at the surface of a body of water. The system includes first and second navigation antennas mounted on the platform. A device is mounted to the platform in a position collinear with the positions of the two antennas. The position of the device can be computed from the ranges of the two antennas relative to the base station, the known distance between the two antennas, and the known distance from one of the antennas to the device. In a typical deployment, the device is an underwater device.

35 Claims, 2 Drawing Sheets

ACCURATE POSITIONING OF DEVICES SUSPENDED UNDERWATER FROM A FLOATING BODY

BACKGROUND

The invention relates generally to positioning underwater devices and, more particularly, to using satellite navigation antennas above the water on a floating body to position devices suspended underwater from the floating body.

The Global Positioning System (GPS) and other satellite navigation systems are used to determine the location of a GPS receiving antenna with a high degree of accuracy. But the signals transmitted by the GPS satellites do not penetrate sea water. So, it is not feasible to position a GPS antenna underwater to determine its location. An underwater device suspended beneath a floating body, such as a buoy, is subject to the rolling, pitching, and rotating that a floating body at the ocean's surface undergoes. Present techniques used to determine the complex motion of a buoy include a four-antenna GPS system and a combination of GPS, compass, and tiltmeters to resolve the buoy's attitude and relate the position of the GPS antenna to an underwater device. But mounting all this equipment to a buoy is complicated and expensive. Furthermore, the power requirements for so many sensors or GPS receivers can be quite high.

Thus, there is a need for a relatively inexpensive and simple way to accurately locate devices suspended underwater from a body floating at the ocean's surface.

SUMMARY

This need and other needs are satisfied by apparatus embodying features of the invention. An apparatus for accurately determining the position of a device suspended underwater from a floating platform at the surface of a body of water comprises first and second navigation antennas. The first antenna is disposed on the floating platform at a first position above the surface of the water. The second antenna is also disposed on the platform above the water, but at a second position. An underwater device is suspended from the floating platform at a third position below the surface of the water. The first, second, and third positions are all collinear.

In another aspect of the invention, a differential GPS system for the same purpose includes first and second GPS antennas disposed above water at first and second positions on a floating platform. An underwater device is suspended from the platform at a third position below the surface of the water. The first, second, and third positions are collinear. A base station that includes a GPS base antenna and receiver for receiving GPS signals is located at a base position spaced from the floating platform. At least one GPS receiver on the floating platform is coupled to the first and second GPS antennas for receiving GPS signals. The receiver also communicates with the GPS base receiver to operate in a differential GPS mode to determine first and second coordinates corresponding to the first and second positions relative to the base position. Means are provided for determining third coordinates corresponding to the third position relative to the base position from the first and second coordinates.

In yet another aspect of the invention, a differential navigation system for accurately determining the position of a device suspended underwater from a floating platform floating at the surface of a body of water comprises a first antenna and a second antenna. The first antenna is disposed on the floating platform at a first position above the water. The second antenna is disposed at a second position above the water. An underwater device is suspended from the floating platform at a third position below the surface of the water collinear with the first and second positions. A base station includes a base antenna and receiver for receiving ranging signals. The base station is located at a base position spaced from the floating platform. At least one receiver on the floating platform is coupled to the first and second antennas for receiving ranging signals. The receiver also communicates with the base receiver to operate in a differential navigation mode for determining first and second coordinates corresponding to the first and second positions relative to the base position. The system also includes means for determining third coordinates corresponding to the third position relative to the base position from the first and second coordinates.

In still another aspect of the invention, apparatus for determining the position of a device attached to a floating platform floating at the surface of a body of water comprises first and second navigation antennas. The first antenna is disposed on the platform at a first above-water position. The second antenna is disposed at a second above-water position. A device is attached to the floating platform at a third position collinear with the first and second positions. A receiver on the platform is coupled to the antennas for receiving ranging signals to determine first and second coordinates corresponding to the first and second positions. The apparatus also includes means for determining third coordinates corresponding to the third position from the first and second coordinates.

According to another aspect of the invention, a method for accurately determining the position of the device suspended underwater from a floating platform comprises: mounting a first navigation antenna to the floating platform at a first position above the surface of the water; mounting a second navigation antenna at a second position above the surface and below the first antenna; suspending a device from the floating platform at a third position below the surface of the water; and maintaining a collinear relationship between the first, second, and third positions.

BRIEF DESCRIPTION OF THE DRAWINGS

These features and aspects of the invention, as well as its advantages, are better understood by reference to the following description, appended claims, and accompanying drawings, in which:

DETAILED DESCRIPTION

Figure 1:
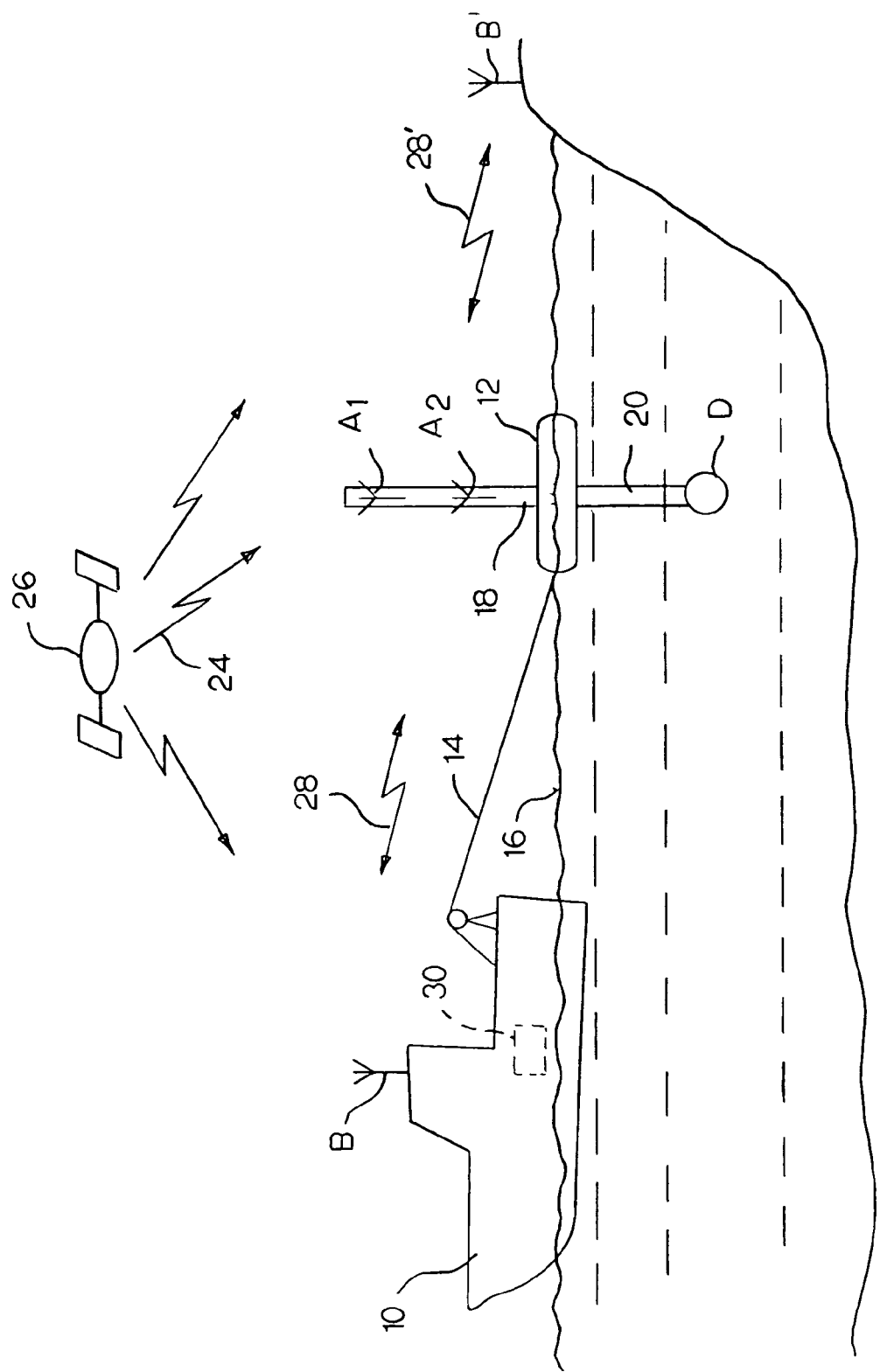
FIG. 1 is a pictorial representation of a marine deployment of a positioning system embodying features of the invention for use with a buoy.

A representation of a system embodying features of the invention is illustrated in FIG. 1. A survey vessel 10 tows a buoy 12 across a body of water with a cable 14. The buoy floats at the surface 16 of the water. Navigation antennas $A_1$, and $A_2$ are attached to structure 18 on the buoy, with antenna $A_1$, positioned above $A_2$. Suspended below the buoy from underwater structure 20 is a device D at a third position beneath the surface of the water. The antennas $A_1$, and $A_2$ are positioned collinear with the underwater device D.

A base navigation antenna B is mounted on the survey vessel. The navigation antennas are connected to navigation receivers as part of a navigation system, such as a satellite navigation system. Preferably, the navigation receivers and antennas are GPS satellite navigation receivers and antennas because of the ready availability of GPS products. The antennas receive coded signals 24 from GPS satellites 26, from which ranges are determined by the GPS navigation receivers. The base receiver communicates with the buoy receivers over a radio link 28. Operated in a differential GPS mode, the system can accurately determine ranges. In the absence of the towing vessel, a stationary base station with a GPS antenna B', on land, for example, can be used if the buoy is floating close enough to shore to communicate with the land base station over its radio communication link 28'.

Each buoy in this version has two dual-frequency GPS antennas and two dual-frequency GPS receivers operated in the RTK (real-time kinematic) mode. The receivers on the buoy receive range data indicative of the distance between the base antenna B and each of the buoy antennas $A_1$ and $A_2$. One example of an underwater device whose position must be known with a great degree of accuracy is an acoustic transmitter or receiver that is used in a hydroacoustic ranging network of underwater transmitters and receivers attached to streamers, seismic source arrays, and other prospecting equipment towed behind the survey vessel.

Figure 2B:
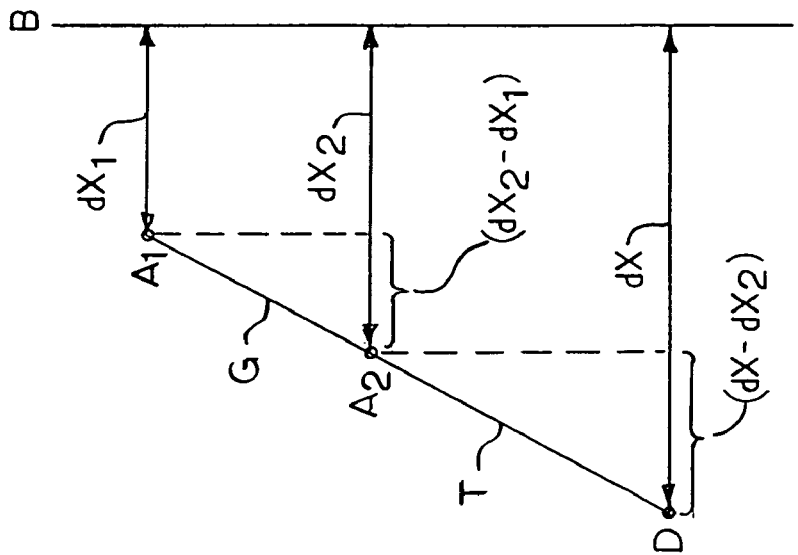
FIG. 2B is a model as in FIG. 2A for a buoy tilted in the x-z plane.
Figure 2A:
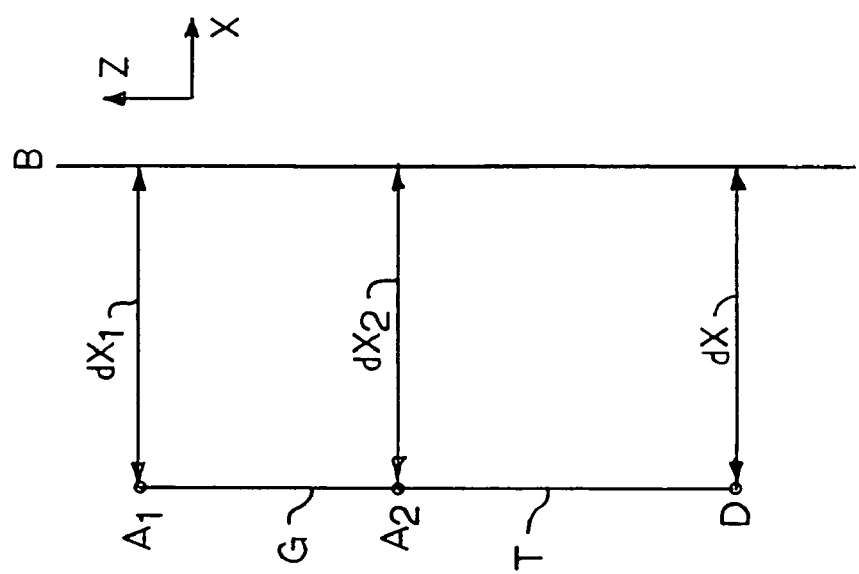
FIG. 2A is a geometric model of the system of FIG. 1 showing the buoy untilted in the x-z plane.

The advantage of arranging the two navigation antennas collinearly with the underwater device is shown in FIGS. 2A and 2B. The figures geometrically represent the linear arrangement of the antennas $A_1$, $A_2$ and the underwater device D in the x-z plane. The upper antenna $A_1$ is spaced from the lower antenna $A_2$ by a distance G. The lower antenna is spaced from the underwater device D by a distance T. The x-component of the ranges from the base antenna B and the first navigation antenna $A_1$, and the second navigation antenna $A_2$ are given $dX_1$, and $dX_2$. In FIG. 2A, in which the buoy is not tilted in the x-z plane, the x-component of the range from the base antenna B to the underwater device D is $dX=dX_1=dX_2$. If the buoy is tilted because of tow speed or wave action, the situation of FIG. 2B may result. Simple geometry shows that $(dX-dX_2)/T = (dX_2-dX_1)/G$. This is equivalent to $dX=dX_2+T(dX_2-dX_1)/G$. Similar representations of the y-z plane and the x-y plane will yield the computed y- and z-components of the range from the base antenna B to the underwater device D. The three components of the coordinates of D relative to the base antenna B are:

$$dX=dX_2+T(dX_2-dX_1)/G \qquad (1)$$

$$dY=dY_2+T(dY_2-dY_1)/G \qquad (2)$$

$$dZ=dZ_2+T(dZ_2-dZ_1)/G, \qquad (3)$$

where $(dX_1, dY_1, dZ_1)$ represents the coordinates of $A_1$ and $(dX_2, dY_2, dZ_2)$ represents the coordinates of $A_2$, both relative to B. Thus, equations (1), (2), and (3) yield the coordinate of D relative to B.

In some instances, because the change in the depth of the underwater device is not significant, the vertical component dZ of the coordinate of D does not have to be computed. In these two-dimensional situations, only equations (1) and (2) need to be solved to yield the two-component coordinate of D, (dX, dY).

It is also possible to operate the receivers on the buoy in a chained mode in which the range coordinates of antenna $A_1$, are measured relative to $A_2$. In that situation, $(dX_2-dX_1)=-dX_1$, $(dY_2-dY_1)=-dY_1$, and $(dZ_2-dZ_1)=-dZ_1$, and equations (1), (2), and (3) become:

$$dX=dX_2-TdX_1/G \qquad (1')$$

$$dY=dY_2-TdY_1/G \qquad (2')$$

$$dZ=dZ_2-TdZ_1/G \qquad (3').$$

Equation (3') may be eliminated if depth does not vary significantly.

The position of the underwater device may be computed using equations (1)–(3) or (1')–(3') by the receiver on the buoy, by the base receiver, or by an intelligent controller 30, such as a computer, aboard the vessel and in communication with the base or buoy receivers. Whichever device solves the equations constitutes means for determining third coordinates representing the position of the underwater device.

Thus, the system provides apparatus and methods for accurately determining the position of a device suspended underwater from a floating platform by using a pair of navigation antennas collinearly arranged with the device. The apparatus operates without the need for tilt sensors, compasses, or other attitude sensors.

Although the invention has been described in detail with respect to a preferred version, other versions are possible. For example, the two navigation antennas may be connected to a single dual-channel navigation receiver instead of two individual receivers. As another example, the various receivers may communicate with each other over wires instead of by radio link. As yet another example, the location of the device need not be below the surface. It could be above the surface as well, as long as it is positioned collinear with the two navigation antennas. As yet another example, other satellite systems, such as GLONASS or other systems that may not yet be on-line, may be used instead of GPS. So, as these few examples suggest, the spirit and scope of the claims are not meant to be limited to the preferred version described in detail.

What is claimed is:

1. Apparatus for accurately determining the position of a device suspended underwater from a floating platform floating at the surface of a body of water, the apparatus comprising:
   a first navigation antenna disposed on a floating platform at a first position above the surface of the water;
   a second navigation antenna disposed on the floating platform at a second position above the surface of the water;
   an underwater device suspended from the floating platform at a third position below the surface of the water;
   wherein the first, second, and third positions are collinear.

2. Apparatus as in claim 1 wherein the underwater device includes an acoustic transmitter.

3. Apparatus as in claim 1 further comprising one or more navigation receivers coupled to the first and second navigation antennas to derive first coordinates defining the first position and second coordinates defining the second position.

4. Apparatus as in claim 3 further comprising means for determining third coordinates defining the third position from the first and second coordinates.

5. Apparatus as in claim 4 further comprising a third navigation antenna disposed apart from the floating platform at a fourth position and wherein the first, second, and third coordinates are defined relative to the fourth position.

6. Apparatus as in claim 3 wherein the navigation receivers are dual-frequency GPS receivers.

7. A differential GPS system for accurately determining the position of a device suspended underwater from a floating platform floating at the surface of a body of water, the system comprising:
- a first GPS antenna disposed on a floating platform at a first position above the surface of the water;
- a second GPS antenna disposed on the floating platform at a second position above the surface of the water;
- an underwater device suspended from the floating platform at a third position below the surface of the water collinear with the first and second positions;
- a base station including a GPS base antenna and receiver for receiving GPS signals, the base station located at a base position spaced from the floating platform;
- at least one GPS receiver on the floating platform coupled to the first and second GPS antennas for receiving GPS signals and in communication with the GPS base receiver to operate in a differential GPS mode for determining first and second coordinates corresponding to the first and second positions relative to the base position;
- means for determining third coordinates corresponding to the third position relative to the base position from the first and second coordinates.

8. A system as in claim 7 further comprising a towing vessel towing the floating platform and wherein the base station is located on the towing vessel.

9. A system as in claim 7 wherein the means for determining third coordinates uses the predetermined spacing G between the first and second positions and the predetermined spacing T between the second and third positions in determining the third coordinates.

10. A system as in claim 9 wherein the means for determining third coordinates computes the third coordinates as two-component coordinates (dX, dY) wherein:

$$dX = dX_2 + T(dX_2 - dX_1)/G$$

$$dY = dY_2 + T(dY_2 - dY_1)/G,$$

wherein $(dX_1, dY_1)$ and $(dX_2, dY_2)$ are the first and second coordinates.

11. A system as in claim 9 wherein the means for determining third coordinates computes the third coordinates as three-component coordinates (dX, dY, dZ) wherein:

$$dX = dX_2 + T(dX_2 - dX_1)/G$$

$$dY = dY_2 + T(dY_2 - dY_1)/G$$

$$dZ = dZ_2 + T(dZ_2 - dZ_1)/G,$$

wherein $(dX_1, dY_1, dZ_1)$ and $(dX_2, dY_2, dZ_2)$ are the first and second coordinates.

12. A system as in claim 9 comprising a first GPS receiver coupled to the first GPS antenna and a second GPS receiver coupled to the second GPS antenna wherein the GPS receivers on the floating platform are operated in the chained mode wherein the ranges to the first antenna are relative to the ranges to the second antenna and wherein the means for determining third coordinates computes the third coordinates as three-component coordinates (dX, dY, dZ) wherein:

$$dX = dX_2 - TdX_1/G$$

$$dY = dY_2 - TdY_1/G$$

$$dZ = dX_2 - TdZ_1/G,$$

wherein $(dX_1, dY_1, dZ_1)$ and $(dX_2, dY_2, dZ_2)$ are the first and second coordinates.

13. A system as in claim 7 wherein the GPS receiver is a dual-frequency receiver and uses the carrier phases of the GPS signals to determine the first and second coordinates.

14. A differential navigation system for accurately determining the position of a device suspended underwater from a floating platform floating at the surface of a body of water, the system comprising:
- a first antenna disposed on a floating platform at a first position above the surface of the water;
- a second antenna disposed on the floating platform at a second position above the surface of the water;
- an underwater device suspended from the floating platform at a third position below the surface of the water collinear with the first and second positions;
- a base station including a base antenna and receiver for receiving ranging signals, the base station located at a base position spaced from the floating platform;
- at least one receiver on the floating platform coupled to the first and second antennas for receiving ranging signals and in communication with the base receiver to operate in a differential navigation mode for determining first and second coordinates corresponding to the first and second positions relative to the base position;
- means for determining third coordinates corresponding to the third position relative to the base position from the first and second coordinates.

15. A system as in claim 14 further comprising a towing vessel towing the floating platform and wherein the base station is located on the towing vessel.

16. A system as in claim 14 wherein the means for determining third coordinates uses the predetermined spacing G between the first and second positions and the predetermined spacing T between the second and third positions in determining the third coordinates.

17. A system as in claim 16 wherein the means for determining third coordinates computes the third coordinates as two-component coordinates (dX, dY) wherein:

$$dX = dX_2 + T(dX_2 - dX_1)/G$$

$$dY = dY_2 + T(dY_2 - dY_1)/G,$$

wherein $(dX_1, dY_1)$ and $(dX_2, dY_2)$ are the first and second coordinates.

18. A system as in claim 16 wherein the means for determining third coordinates computes the third coordinates as three-component coordinates (dX, dY, dZ) wherein:

$$dX = dX_2 + T(dX_2 - dX_1)/G$$

$$dY = dY_2 + T(dY_2 - dY_1)/G$$

$$dZ = dZ_2 + T(dZ_2 - dZ_1)/G,$$

wherein $(dX_1, dY_1, dZ_1)$ and $(dX_2, dY_2, dZ_2)$ are the first and second coordinates.

19. A system as in claim 16 comprising a first receiver coupled to the first antenna and a second receiver coupled to the second antenna wherein the receivers on the floating platform are operated in the chained mode wherein the ranges to the first antenna are relative to the ranges to the second antenna and wherein the means for determining third coordinates computes the third coordinates as three-component coordinates (dX, dY, dZ) wherein:

$$dX = dX_2 - TdX_1/G$$

$$dY = dY_2 - TdY_1/G$$

$$dZ = dX_2 - TdZ_1/G,$$

wherein $(dX_1, dY_1, dZ_1)$ and $(dX_2, dY_2, dZ_2)$ are the first and second coordinates.

20. A system as in claim 14 wherein the receiver and the base receiver are satellite navigation receivers.

21. Apparatus for determining the position of a device attached to a floating platform floating at the surface of a body of water, the apparatus comprising:
a first navigation antenna disposed on a floating platform at a first position above the surface of the water;
a second navigation antenna disposed on the floating platform at a second position above the surface of the water;
a device attached to the floating platform at a third position collinear with the first and second positions;
at least one receiver on the floating platform coupled to the first and second antennas for receiving ranging signals for determining first and second coordinates corresponding to the first and second positions;
means for determining third coordinates corresponding to the third position from the first and second coordinates.

22. Apparatus as in claim 21 wherein the means for determining third coordinates uses the predetermined spacing G between the first and second positions and the predetermined spacing T between the second and third positions in determining the third coordinates.

23. Apparatus as in claim 22 wherein the means for determining third coordinates computes the third coordinates as two-component coordinates (dX, dY) wherein:

$$dX = dX_2 + T(dX_2 - dX_1)/G$$

$$dY = dY_2 + T(dY_2 - dY_1)/G,$$

wherein $(dX_1, dY_1)$ and $(dX_2, dY_2)$ are the first and second coordinates, G is the predetermined spacing between the first and second positions, and T is the predetermined spacing between the second and third positions.

24. Apparatus as in claim 22 wherein the means for determining third coordinates computes the third coordinates as three-component coordinates (dX, dY, dZ) wherein:

$$dX = dX_2 + T(dX_2 - dX_1)/G$$

$$dY = dY_2 + T(dY_2 - dY_1)/G$$

$$dZ = dZ_2 + T(dZ_2 - dZ_1)/G,$$

wherein $(dX_1, dY_1, dZ_1)$ and $(dX_2, dY_2, dZ_2)$ are the first and second coordinates, G is the predetermined spacing between the first and second positions, and T is the predetermined spacing between the second and third positions.

25. Apparatus as in claim 22 comprising a first navigation receiver coupled to the first antenna and a second receiver coupled to the second antenna wherein the receivers on the floating platform are operated in the chained mode wherein the ranges to the first antenna are relative to the ranges to the second antenna and wherein the means for determining third coordinates computes the third coordinates as three-component coordinates (dX, dY, dZ) wherein:

$$dX = dX_2 - TdX_1/G$$

$$dY = dY_2 - TdY_1/G$$

$$dZ = dZ_2 - TdZ_1/G,$$

wherein $(dX_1, dY_1, dZ_1)$ and $(dX_2, dY_2, dZ_2)$ are the first and second coordinates.

26. Apparatus as in claim 21 further comprising:
a base station including a base antenna and receiver for receiving ranging signals and for communicating with the receiver on the floating platform, the base station located at a base position spaced from the floating platform; and
wherein the at least one receiver determines first and second coordinates corresponding to the first and second positions relative to the base position and wherein the means for determining third coordinates determines the third coordinates corresponding to the third position relative to the base station.

27. Apparatus as in claim 21 wherein the at least one receiver and the base receiver are satellite navigation receivers.

28. Apparatus as in claim 21 wherein the device is suspended from the floating platform below the surface of the water.

29. Apparatus as in claim 28 wherein the device includes an acoustic transmitter.

30. Method for accurately determining the position of a device suspended underwater from a floating platform floating at the surface of a body of water, comprising:
mounting a first navigation antenna to a floating platform at a first position above the surface of the water;
mounting a second navigation antenna to the floating platform at a second position above the surface of the water and below the first navigation antenna;
suspending a device from the floating platform at a third position below the surface of the water;
maintaining a collinear relationship between the first, second, and third positions.

31. Method of claim 30 further comprising:
coupling the first and second navigation antennas to a navigation receiver to receive navigation signals picked up by the antennas to determine first and second coordinates corresponding to the first and second positions;
determining third coordinates corresponding to the third position from the first and second coordinates.

32. Method of claim 31 further comprising:
using the predetermined spacing between the first and second positions and the predetermined spacing between the second and third positions to determine the third coordinates.

33. Method of claim 31 further comprising:
positioning a base navigation antenna and receiver at a base position spaced apart from the floating platform;
operating the base navigation receiver and the navigation receiver on the floating platform in a differential positioning mode to provide the first, second, and third coordinates corresponding to the first, second, and third positions relative to the base position.

34. Method of claim 33 further comprising:
computing the third coordinates as two-component coordinates (dX, dY) wherein:

$$dX = dX_2 + T(dX_2 - dX_1)/G$$

$$dY = dY_2 + T(dY_2 - dY_1)/G,$$

wherein $(dX_1, dY_1)$ and $(dX_2, dY_2)$ are the first and second coordinates, G is the predetermined spacing between the first and second positions, and T is the predetermined spacing between the second and third positions.

35. Method of claim 33 further comprising:
computing the third coordinates as three-component coordinates (dX, dY, dZ) wherein:

$dX = dX_2 + T(dX_2 - dX_1)/G$ $dY = dY_2 + T(dY_2 - dY_1)/G$ $dZ = dZ_2 + T(dZ_2 - dZ_1)/G,$ wherein $(dX_1, dY_1, dZ_1)$ and $(dX_2, dY_2, dZ_2)$ are the first and second coordinates, G is the predetermined spacing between the first and second positions, and T is the predetermined spacing between the second and third positions.

* * * * *